United States Patent
Billore et al.

(10) Patent No.: US 10,574,527 B2
(45) Date of Patent: Feb. 25, 2020

(54) COMPARTMENTALIZED OVERCOMMITTING OF RESOURCES

(71) Applicant: International Business Machines Corporation, Armonk, NY (US)

(72) Inventors: Ashish Billore, Bangalore (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/149,205

(22) Filed: May 9, 2016

(65) Prior Publication Data

US 2017/0324810 A1 Nov. 9, 2017

(51) Int. Cl.
*H04L 12/24* (2006.01)

(52) U.S. Cl.
CPC .............. *H04L 41/0896* (2013.01)

(58) Field of Classification Search
USPC .......................................... 709/226
See application file for complete search history.

(56) References Cited

U.S. PATENT DOCUMENTS

| | | | | |
|---|---|---|---|---|
| 7,734,679 B2* | 6/2010 | Di Luoffo | ........... | G06F 11/0709 709/202 |
| 9,621,654 B2* | 4/2017 | Magdon-Ismail | .......................... | H04L 67/1097 |
| 2010/0070978 A1* | 3/2010 | Chawla | .................. | G06F 9/5077 718/105 |
| 2013/0297655 A1* | 11/2013 | Narasayya | ........ | G06F 17/30575 707/791 |
| 2015/0355926 A1 | 12/2015 | Cropper et al. | | |
| 2016/0043968 A1* | 2/2016 | Jacob | .................... | H04L 47/808 709/226 |
| 2016/0098297 A1* | 4/2016 | Yuyitung | ............ | G06F 11/3442 718/104 |

OTHER PUBLICATIONS

Michael Tighe, Gaston Keller, Michael Bauer, Hanan Lutfiyya, "DCSim: A data Centre Simulation Tool for Evaluating Dynamic Virtualized Resource Management", 6th International DMTF workshop on Systems and Virtualization Management (SVM 2012)/ CNSM 2012.*
Disclosed Anonymously et al., "Method to optimize resource requirement for OSGi application in cloud", An IP.com Prior Art Database Technical Disclosure, IP.com No. IPCOM000226038D, IP.com Electronic Publication Date: Mar. 21, 2013, 4 pages.

(Continued)

*Primary Examiner* — Brian Whipple
*Assistant Examiner* — John Fan
(74) *Attorney, Agent, or Firm* — Andrew Aubert

(57) ABSTRACT

As disclosed herein a computer-implemented method includes providing a plurality of resource allocation zones corresponding to a plurality of overcommit policies. The method further includes receiving a request for a resource for a tenant, and determining a selected overcommit policy corresponding to an anticipated resource need. The method further includes selecting a resource allocation zone for the tenant from the plurality of resource allocation zones, and providing the resource to the tenant. A computer program product and a computer system corresponding to the above method are also disclosed herein.

17 Claims, 8 Drawing Sheets

(56) References Cited

OTHER PUBLICATIONS

IBM Knowledge Center, "Setting resource over commit ratio for an individual host aggregate", Platform Resource Scheduler 2.2.0, printed on Mar. 8, 2016, 1 page, <http://www.ibm.com/support/knowledgecenter/SS8MU9_2.2.0/Admin/tasks/settingresourceovercommitratios_individual.dita?lang=en>.

IBM Knowledge Center, "Setting resource over commit ratios for the whole cluster", Platform Resource Scheduler 2.2.0, printed on Mar. 8, 2016, 1 page, <http://www.ibm.com/support/knowledgecenter/SS8MU9_2.2.0/Admin/tasks/settingresourceovercommitratios.dita?lang=en>.

Mell et al., "The NIST Definition of Cloud Computing", NIST National Institute of Standards and Technology U.S. Department of Commerce, Special Publication 800-145, Sep. 2011, 7 pages.

"Overcoming Resource over Commit and Bundling Issues in the Cloud", CloudSigma, 2016 CloudSigma Holding AG, 5 pages, <https://www.cloudsigma.com/overcoming-resource-over-commit-and-bundling-issues-in-the-cloud/>.

\* cited by examiner

COMPARTMENTALIZED OVERCOMMITTING OF RESOURCES

BACKGROUND

The present invention relates to provisioning requests for resources, and more particularly to overcommitting of provisioned resources, such as cloud resources.

With the continual growth of digital information in the world, there is an ever increasing reliance on cloud computing (e.g., on-demand computing). Cloud computing is a model for enabling convenient, on-demand network access to a shared pool of configurable computing resources (e.g., servers, storage, applications and services) that can be rapidly provisioned and released with minimal management effort. The availability of low-cost computers and storage devices, as well as, the widespread adoption of hardware virtualization and service-oriented architecture have led to a growth in cloud computing. The scalability offered by cloud computing enables corporations to scale up as computing needs increase and then scale down again as demands decrease.

SUMMARY

As disclosed herein a computer-implemented method includes providing a plurality of resource allocation zones corresponding to a plurality of overcommit policies. The method further includes receiving a request for a resource for a tenant, and determining a selected overcommit policy corresponding to an anticipated resource need. The method further includes selecting a resource allocation zone for the tenant from the plurality of resource allocation zones, and providing the resource to the tenant. A computer program product and a computer system corresponding to the above method are also disclosed herein.

DETAILED DESCRIPTION

Figure 1:
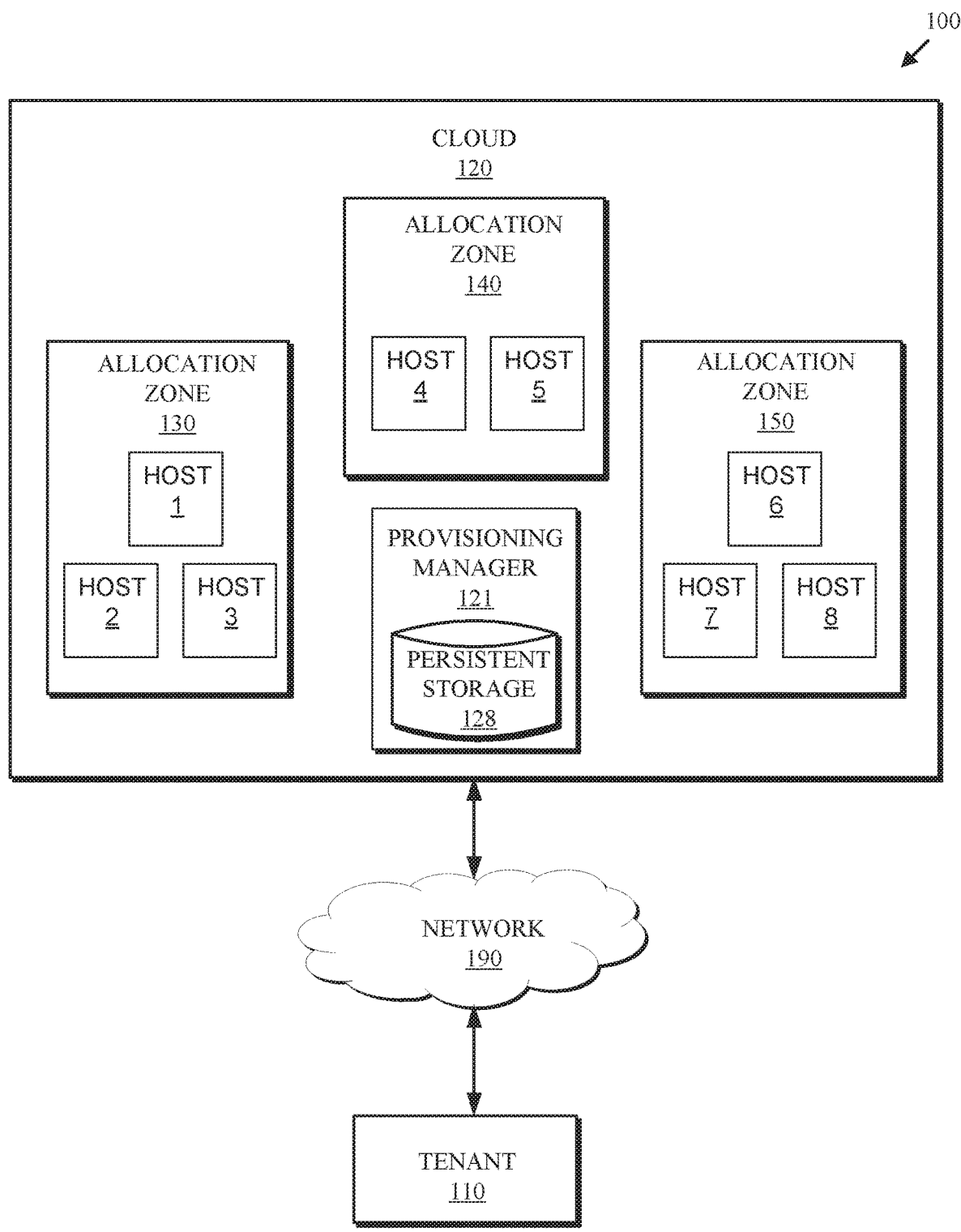
FIG. 1 is a functional block diagram depicting a computing environment, in accordance with at least one embodiment of the present invention.

Corporations rely on computers to manage and maintain many aspects of their day to day business operations. To manage fluctuating computing resource requirements, corporations may take advantage of cloud computing offerings. Using cloud computing resources enables a corporation to obtain additional computing resources when demand increases, and then subsequently release the additional resources when demand declines.

A cloud resource provider may have potentially conflicting business objectives to (i) support a strategy of overcommitting resources to assist with maintaining profit margins, and (ii) maintain customer satisfaction (CustSat) by reducing service level agreement (SLA) violations for tenants. An SLA violation may occur, for example, when a critical workload experiences degraded performance that results from a failure to provide overcommitted resources to the critical workload. While current resource provisioning solutions strive to address concerns of both the cloud providers and the customer organizations (i.e., providing overcommit strategy, and maintaining positive CustSat), the cloud providers are not able to adequately provide both of the above business objectives effectively and efficiently.

When a corporation determines a need to request a resource from a cloud environment, placing the request may be as simple as identifying the required resource (e.g., a virtual machine (VM) with 1 CPU, 8 Gig of memory, and a 50 Gig of storage), and asking a cloud resource provider for the resource. The resource provider may fulfill the request and provide the provisioned server to the requester without any knowledge of the intended use of the resource. Additionally, the requester may have no input or knowledge of the physical-to-virtual resources availability (i.e., the overcommit policy) on the host computer from which the requested resource was obtained. If the cloud provider is not able to provide the resources with an overcommit policy that meets the need of the requester, then the requester may need to negotiate with the provider for a private cloud or perhaps purchase additional hardware to meet the needs of the requester. Use of a private cloud or dedicated resource may result is substantial additional expense to the corporation when compared to using a public cloud resource.

The embodiments disclosed herein recognize that providing requesters of cloud resources with visibility to overcommit policies and the costs associated with the policies may enable the requester to select an overcommit policy that provides acceptable performance at an acceptable cost. Enabling the requester to decide which overcommit policies are acceptable removes, from the resource provider, the responsibility of determining the overcommit policies without input from the requester. The present invention leverages the above observations and will now be described in detail with reference to the Figures.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

FIG. 1 is a functional block diagram depicting a computing environment 100, in accordance with at least one embodiment of the present invention. Computing environment 100 includes tenant 110 and cloud 120 that communicate with each other over network 190. When tenant 110 determines a requirement for additional computer resources, the client can request the required container from cloud 120.

Cloud 120 includes provisioning manager 121, and allocation zones (compartments) 130, 140, and 150. Each allocation zone includes a collection of one or more hosts: allocation zone 130 includes host 1, host 2, and host 3; allocation zone 140 includes host 4 and host 5; and allocation zone 150 includes host 6, host 7, and host 8. A host may be a computing device that can be virtualized as containers (e.g., VMs). Tenant 110 and hosts (1-8) can be computing devices such as smart phones, tablets, desktop computers, laptop computers, specialized computer servers, or the like that are capable of processing instructions and communicating over network 190.

Each allocation zone (e.g., allocation zones 130, 140, and 150) can be comprised of one or more hosts (e.g. hosts 1-8) that are configured to provide containers that implement (enforce) a specific overcommit policy. Each host within an allocation zone implements the same overcommit policy. Therefore, each container provisioned from an allocation zone will be provisioned using the same overcommit policy. An overcommit policy may include rules (overcommit rules) defining a ratio of the amount of virtual resource provisioned by a host with respect to the amount of physical resource included on the host (i.e., a virtual-to-physical resource ratio).

Each allocation zone may provision a container that includes one or more resource elements. A resource element may represent, for example, but not limited to, central processing unit (CPU), random access memory (RAM), and storage. Each resource element may have a specific, configurable, virtual-to-physical resource ratio assigned to it. For example, a CPU ratio of 16:1, or 16, indicates that up to 16 virtual CPU's may be provisioned for each physical CPU included on the host, and a CPU ratio of 1:1, or 1, indicates that only one virtual CPU will be provisioned for each physical CPU (i.e., no overcommitting of CPU resource will occur). There may be more than one overcommit policy defined for a resource provider (e.g., cloud 120). However, each allocation zone may be associated with only one overcommit policy. In some embodiments, there is a default overcommit policy and a no-overcommit policy. In some embodiments, there is a default overcommit policy, a no-overcommit policy and one or more customized overcommit policies. Each customized overcommit policy may contain different overcommit ratios for each resource element.

Provisioning manager 121 may be configured to monitor and manage resource requests for cloud resources directed to cloud 120. Provisioning manager 121 manages allocation zones 130, 140, and 150, and is aware of the predetermined overcommit policy associated with allocation zones 130, 140, and 150. Additionally, provisioning manager 121 may collect and maintain historical usage data corresponding to each container provisioned from cloud 120. The historical usage data may include, but is not limited to the allocation zone used, the overcommit policy, and the amount/percentage of each resource element used at different times. The collected (historical) data may be retained on persistent storage 128 in a file system, database or some other means familiar to those of skill in the art. The historical data may be used to analyze the consumption of each resource element corresponding to the container and suggest determine if migrating the workload to a different allocation zone that may result in a more optimal resource consumption.

In the depicted embodiment, provisioning manager 121 is separate from allocation zones 130, 140, and 150. In other embodiments, a host (e.g., host 1) contains provisioning manager 121. In another embodiment, provisioning manager 121 is a remotely located web application that communicates with cloud 120 and manages allocation zones 130, 140, and 150 via network 190. Provisioning manager 121 includes persistent storage 128. Persistent storage 128 may be any non-volatile storage device or media known in the art. For example, persistent storage 128 can be implemented with a tape library, optical library, solid state storage, one or more independent hard disk drives, or multiple hard disk drives in a redundant array of independent disks (RAID). Similarly, data on persistent storage 128 may conform to any suitable storage architecture known in the art, such as a file, a relational database, an object-oriented database, and/or one or more tables.

Tenant 110, cloud 120, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between tenant 110 and cloud 120 in accordance with at least one embodiment of the present invention.

Figure 2:
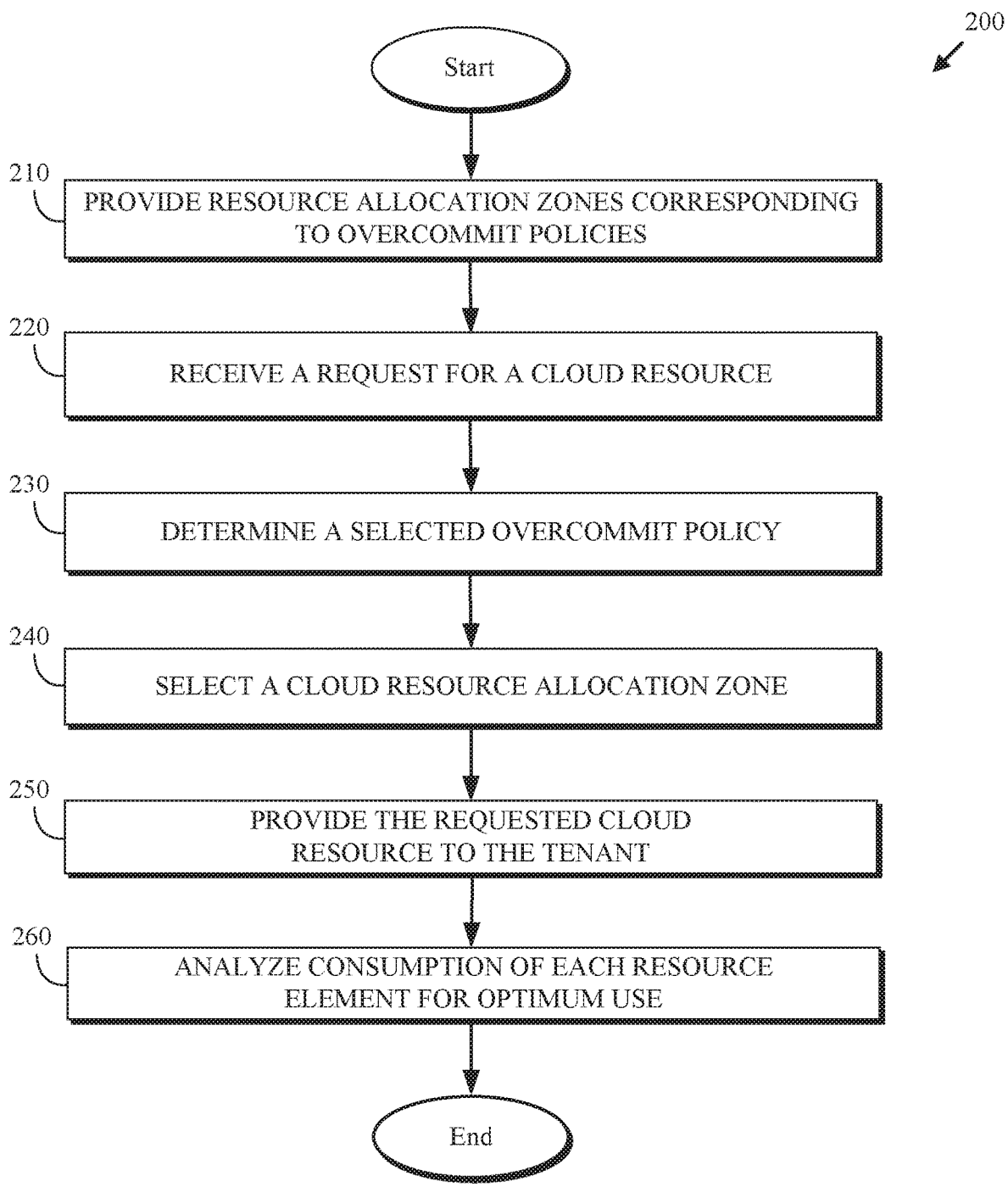
FIG. 2 is a flowchart depicting a cloud resource provisioning method, in accordance with at least one embodiment of the present invention.

FIG. 2 is a flowchart depicting cloud resource provisioning method 200, in accordance with at least one embodiment of the present invention. As depicted, cloud resource provisioning method 200 includes providing (210) resource allocation zones, receiving (220) a request for a cloud resource, determining (230) a selected overcommit policy, selecting (240) a cloud resource allocation zone, providing (250) the requested cloud resource to the tenant, and analyzing (260) the resource consumption. Cloud resource provisioning method 200 enables provisioning manager 121 to manage one or more overcommit policies that correspond to one or more allocation zones. Additionally, cloud resource provisioning method 200 enables the requester of a resource to determine from which allocation zone the requested resource should be provisioned.

Providing (210) resource allocation zones (hereinafter allocation zones) may include provisioning manager 121 identifying a host that is to be included in an allocation zone. Provisioning manager 121 may determine an overcommit policy associated with the allocation zone, and then configure the host to implement the overcommit policy associated with the allocation zone. Hosts that implement a common overcommit policy can be logically grouped into an allocation zone (e.g., allocation zones 130, 140, and 150). For example, (i) each host in allocation zone 130 may implement a default overcommit policy; (ii) each host in allocation zone 140 may implement a no-overcommit policy; and (iii) each host in allocation zone 150 may implement the same custom overcommit policy.

Provisioning manager 121 can add the host to an existing allocation zone matching the implemented overcommit policy. Alternatively, provisioning manager 121 can create a new allocation zone for the host. In some embodiments, information that identifies the overcommit policy associated with an allocation zone is stored on persistent storage 128. In other embodiments, information that identifies the overcommit policy associated with an allocation zone is stored on one or more hosts included in the allocation zone.

Receiving (220) a request for a cloud resource may include provisioning manager 121 receiving a request for one or more cloud resources to be owned and used by tenant 110. The request may be initiated from the tenant for which the request is being made (e.g., tenant 110). Alternatively, a requester using another computing device may initiate the request on behalf of tenant 110. In some embodiments, provisioning manager 121 performs authentication and authorization operations to verify the identity and authorities of the requester. In other embodiments, an external provider provides authentication and authorization services, and the received request is known to be authentic and valid.

Determining (230) a selected overcommit policy may include provisioning manager 121 questioning the requester to determine the selected overcommit policy. In some embodiments, provisioning manager 121 allows the requester to select an overcommit policy for a requested resource. In some embodiments, provisioning manager 121 presents the requester with a set of questions (e.g. a series of questions) about the intended application and expected workload (e.g., is the application SLA critical, is the workload memory critical, is the workload CPU critical, etc.). The answers to the questions may identify an ideal overcommit policy that meets the needs of the request. In some embodiments, provisioning manager 121 selects the identified overcommit policy and informs the requester of the selected overcommit policy.

In some embodiments, if there is not an exact match between existing overcommit policies and the ideal overcommit policy, then provisioning manager 121 selects the overcommit policy that most closely matches the ideal overcommit policy. In other embodiments, if there is not an exact match between existing overcommit policies and the ideal overcommit policy, then provisioning manager 121 determines a set of closely related overcommit policies. Provisioning manager 121 then presents the set of closely related overcommit policies to the requester and allows the requester to select the best overcommit policy.

Selecting (240) a cloud resource allocation zone may include provisioning manager 121 determining which overcommit policy is selected for the requested resource (e.g., the overcommit policy selected during operation 230). In some embodiments, provisioning manager 121 retrieves a mapping of overcommit policies to allocation zones from persistent storage 128. In other embodiments, provisioning manager 121 determines the overcommit policy corresponding to each allocation zone by querying one or more hosts in each allocation zone and receiving overcommit policy information associated with each allocation zone.

The possibility exists that provisioning manager 121 may determine that more than one allocation zone implements the selected overcommit policy. When there are multiple allocation zones that implement the same overcommit policy, provisioning manager 121 decides which allocation zone will provide the requested resource. In some embodiments, provisioning manager 121 randomly selects one of the allocation zones. In other embodiments, provisioning manager 121 selects the allocation zone with the most available (i.e., not provisioned) resource. In another embodiment, provisioning manager 121 chooses the allocation zone with a host located near the tenant.

Providing (250) the requested cloud resource to the tenant may include provisioning manager 121 enabling the tenant to access (e.g., connect to) the requested cloud resource. Enabling access may include providing access information to the requester and/or administrator. Access information may include resource specifications, resource location, and connection instructions including an administrator userid and password. The requester or administrator may be aware of the allocation zone from which the requested resource was provisioned, however, the requester or tenant are not aware of the host within the allocation zone that is providing the requested resource. Additionally, provisioning manager 121 may provide, to the requestor and/or administrator, an itemized list of overcommit ratios associated with each resource element that are part of the resource. In some embodiments, the itemized list includes charges corresponding to each of the overcommit ratios. In other embodiments, the itemized list of overcommit ratios is provided, but itemized charges for resource are included during a normal billing operation.

Requiring a requester to be involved in the selection of the overcommit policy and the allocation zone selection enables the requester to be aware of the overcommit policy for which he will eventually be billed. Providing an itemized listing of overcommit ratios and associated costs may provide more granular billing information and insight to the requester.

Analyzing (260) the resource consumption may include provisioning manager 121 analyzing the consumption of each resource element (e.g., CPU, RAM, and storage) included in the resource container. The analysis operation (e.g., adaptive analytics) may determine that, over a selected duration, the workload corresponding to the resource is not optimally utilizing the resource (e.g., one or more resource elements are being under-utilized; one or more resource elements are being over-utilized; or a combination of the two). If provisioning manager 121 determines that the resource is not be optimally utilized, the provisioning manager 121 may determine if a more optimal overcommit policy exists (i.e., a more optimal resource allocation zone), and then recommend a migration to a new resource. Determining optimal utilization and migration will be described in greater detail with regard to FIG. 4.

Figure 3:
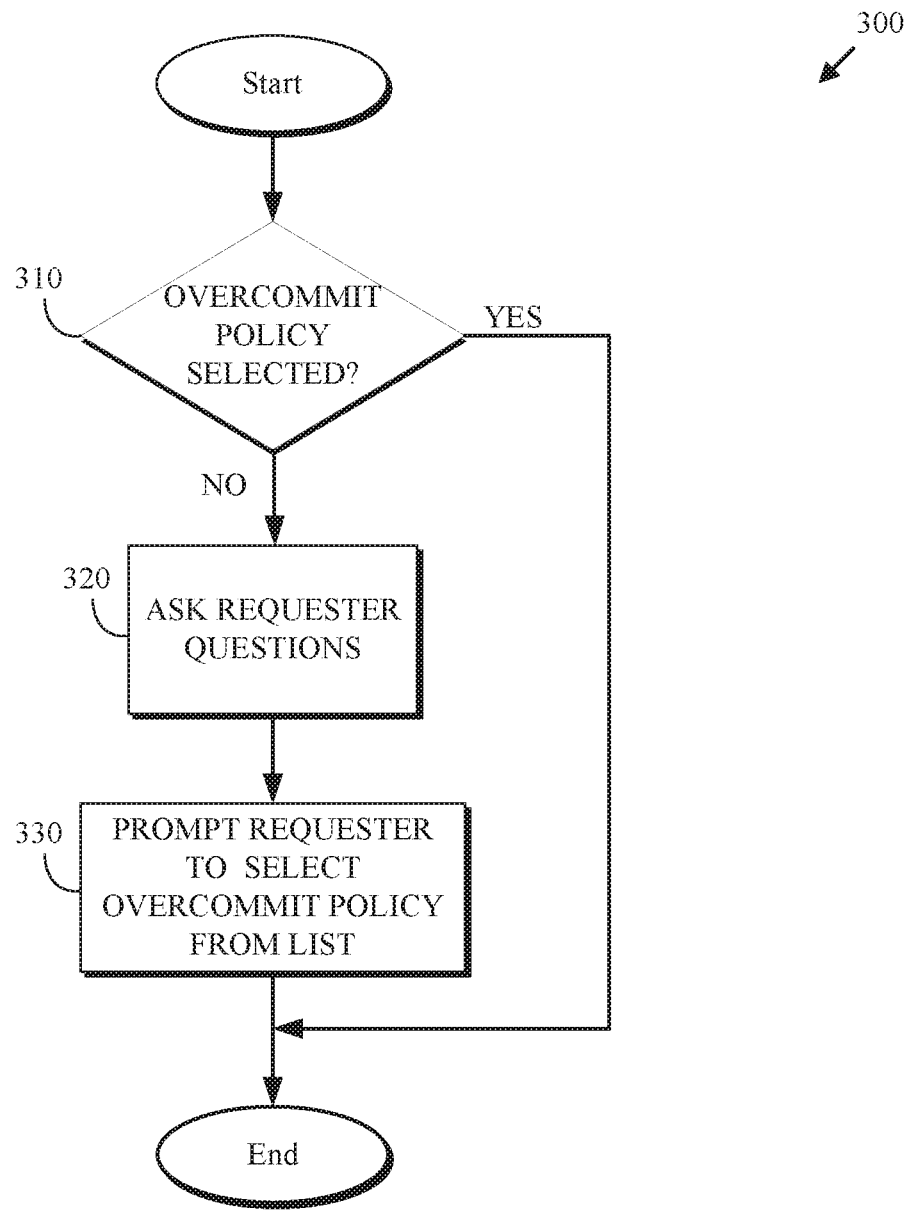
FIG. 3 depicts an overcommit policy selection method, in accordance with at least one embodiment of the present invention.

FIG. 3 depicts overcommit policy selection method 300, in accordance with at least one embodiment of the present invention. As depicted, overcommit policy selection method 300 includes determining (310) whether and overcommit policy has been selected, asking (320) questions, and prompting (330) the requester to select an overcommit policy. Overcommit policy selection method 300 enables provisioning manager 121 to involve the requester in the selection of an overcommit policy.

Determining (310) whether and overcommit policy has been selected may include provisioning manager 121 detecting if the requester has identified a selected overcommit policy when initiating a cloud resource request. In some embodiments, the requester selects a specific overcommit policy when initiating a cloud resource request, and provisioning manager 121 later identifies an allocation zone that implements (e.g., is configured for) the selected overcommit policy. In some embodiments, when initiating a cloud resource request, the requester selects an allocation zone. The allocation zone is mapped to a single overcommit policy which is then identified as the selected overcommit policy. In some embodiments, the requester does not select an overcommit policy. If an overcommit policy is selected, then overcommit policy selection method 300 ends. Otherwise, overcommit policy selection method 300 proceeds to the questioning operation 320.

Asking (320) questions may include provisioning manager 121 asking the requester a set of questions that may enable provisioning manager 121 to determine an appropriate overcommit policy to be associated with the cloud resource request. The questions may be targeted toward determining required critical resource. The questions may be, for example, (i) is the application SLA critical—'yes' indicating that a no-overcommit policy may be best; (ii) is the workload memory critical—'yes' indicating that an overcommit policy with a RAM ratio of 1 may a good selection; and (iii) is the workload CPU critical—'yes' indicating that an overcommit policy with a CPU ratio of 1 may a good selection.

Provisioning manager 121 may analyze the answers to all questions and determine one or more overcommit policies that are appropriate for the requested resource. In some embodiments, one overcommit policy is identified as appropriate, and provisioning manager 121 selects the identified overcommit policy. In some embodiments, provisioning manager 121 creates a list of one or more overcommit policies that may be appropriate for the requested resource. In some embodiments, no overcommit polices are identified as appropriate and provisioning manager 121 creates a list of all overcommit policies. In other embodiments, no overcommit polices are identified as appropriate and provisioning manager 121 creates a list that includes only the default overcommit policy and the no-overcommit policy.

Prompting (330) the requester to select an overcommit policy may include provisioning manager 121 presenting a list of overcommit policies (e.g., the list created in the asking questions operation 320) to the requester and enabling the requester to select an overcommit policy from the list. In some embodiments, if the requester does not select an overcommit policy then provisioning manager 121 selects the default overcommit policy. In other embodiments, if the requester does not select an overcommit policy then provisioning manager 121 terminates the resource request.

Figure 4:
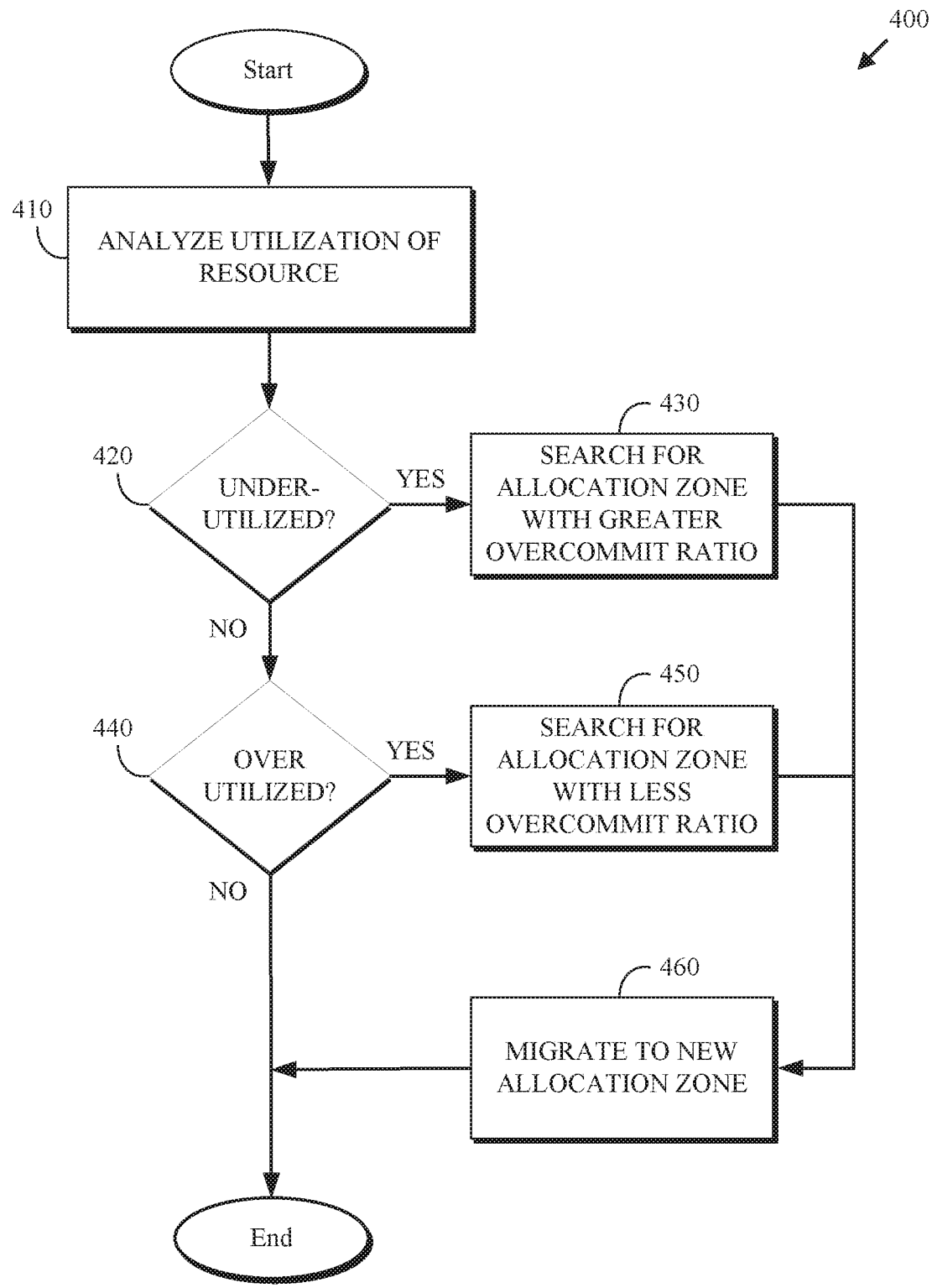
FIG. 4 depicts a utilization analysis method, in accordance with at least one embodiment of the present invention.

FIG. 4 depicts utilization analysis method 400, in accordance with at least one embodiment of the present invention. As depicted, utilization analysis method 400 includes analyzing (410) the utilization of a resource, determining (420) whether the resource is under-utilized, searching (430) for an allocation zone with a greater commit ratio, determining (440) whether the resource is over-utilized, searching (450) for an allocation zone with a lesser commit ratio, and migrating (460) the resource. Utilization analysis method 400 enables provisioning manager 121 to analyze how a workload is utilizing a resource and determine if the resource is either over-utilized or under-utilized.

Analyzing (410) the utilization of a resource may include provisioning manager 121 monitoring a resource over a selected (e.g., configurable) duration and analyzing the utilization of each of the resource elements over the duration. In some embodiments, the requester or an administrator must authorize the monitoring and analyzing operation. In other embodiments, provisioning manager 121 automatically performs the monitoring and analyzing operation on all provisioned resources. If a resource is being under-utilized (e.g., there is more resource than the workload is using), then the tenant may be paying for resource that is not necessary to perform the current workload. On the other hand, if a resource is being over-utilized (e.g., the workload is running out of necessary resource), then the workload may not be performing as well as it could.

Determining (420) whether the resource is under-utilized may include provisioning manager 121 checking the results of the analyzing operation 410 to see if the resource has been under-utilized. If the resource has been under-utilized, then utilization analysis method 400 proceeds to search operation 430. Otherwise, utilization analysis method 400 proceed to determining operation 440.

Searching (430) for an allocation zone with a greater commit ratio may include provisioning manager 121 determining which resource element is under-utilized and searching for an overcommit policy that includes a greater overcommit ratio for the resource element that is under-utilized. Additionally, the new overcommit policy should include appropriate ratios for other resource elements that are optimally utilized by the workload. If the search operation determines that more than one overcommit policy may provide a more optimal resource utilization for the workload, then provisioning manager 121 may create a list of all overcommit policies that meet the search requirements.

Determining (440) whether the resource is over-utilized may include provisioning manager 121 checking the results of the analyzing operation 410 to see if the resource has been under-utilized. If the resource has been under-utilized, then utilization analysis method 400 proceeds to search operation 450. Otherwise, utilization analysis method 400 terminates.

Searching (450) for an allocation zone with a lesser commit ratio may include provisioning manager 121 determining which resource element is over-utilized and searching for an overcommit policy that includes a lesser overcommit ratio for the resource element that is over-utilized. Additionally, the new overcommit policy should include appropriate ratios for other resource elements that are optimally utilized by the workload. If the search operation determines that more than one overcommit policy may provide a more optimal resource utilization for the workload, then provisioning manager 121 may create a list of all overcommit policies that meet the search requirements.

Migrating (460) the resource may include provisioning manager 121 notifying the requester and/or an administrator about the detected utilization issue. In some embodiments, provisioning manager 121 provides, to the administrator of the current resource, a list of one or more overcommit policies that will provide a more optimal resource utilization. In some embodiments, the list may include costs associated with the current overcommit policy as well as the cost that would be associated with each of the suggested overcommit policies, enabling a cost comparison. In some embodiments, the list identifies the allocation zone(s) that implement the overcommit policies.

In some embodiments, after the administrator selects a new overcommit policy, provisioning manager 121 automatically performs a migration operation that moves the contents of the resource from the current allocation zone (e.g., allocation zone 130) to an allocation zone that implements the newly selected overcommit policy (e.g., allocation zone 150). The migration operation may include provisioning a new container in a new allocation zone, moving the contents to the new resource, and returning the original resource to cloud 120. In other embodiments, provisioning manager 121 only suggests a migration operation. It is the responsibility of the administrator to determine if migration is acceptable, and initiate the migration operation. After a migration of a resource is complete, the new resource may be monitored by utilization analysis method 400 to assure continued optimal resource utilization.

Figure 5:
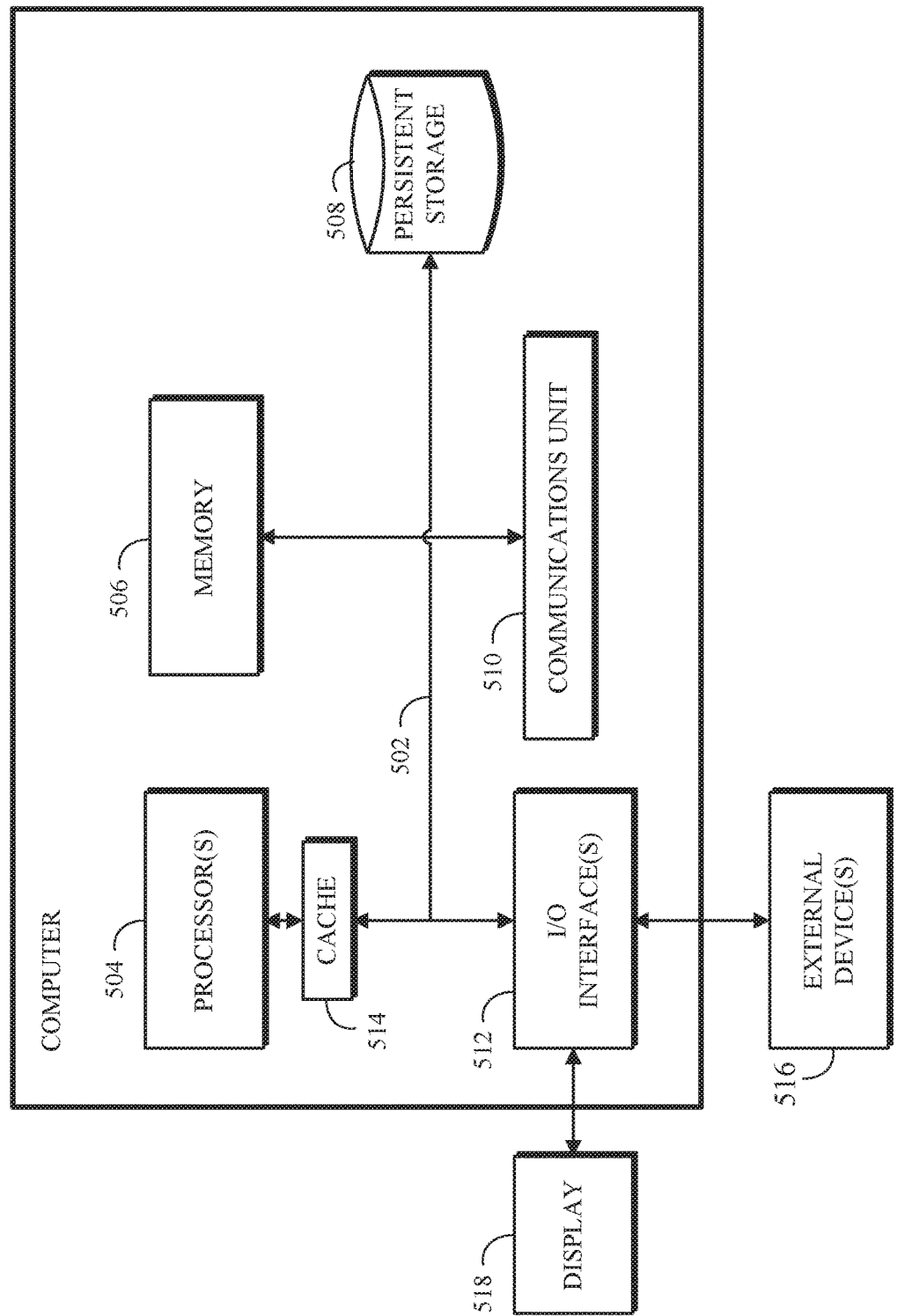
FIG. 5 is a functional block diagram depicting various components of one embodiment of a computer suitable for executing the methods disclosed herein.

FIG. 5 depicts a functional block diagram of components of a computer system 500, which is an example of systems such as tenant 110 and hosts (1-8) within computing environment 100 of FIG. 1, in accordance with at least one embodiment of the present invention. It should be appreciated that FIG. 5 provides only an illustration of one implementation and does not imply any limitations with regard to the environments in which different embodiments can be implemented. Many modifications to the depicted environment can be made.

Tenant 110 and hosts (1-8) include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., cloud resource provisioning method 200, overcommit policy selection method 300, and utilization analysis method 400 are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of tenant 110 and hosts (1-8). In these examples, communications unit 510 includes one or more network interface cards. Communications unit 510 may provide communications through the use of either or both physical and wireless communications links. Program instructions and data used to practice embodiments of cloud resource provisioning method 200, overcommit policy selection method 300, and utilization analysis method 400 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
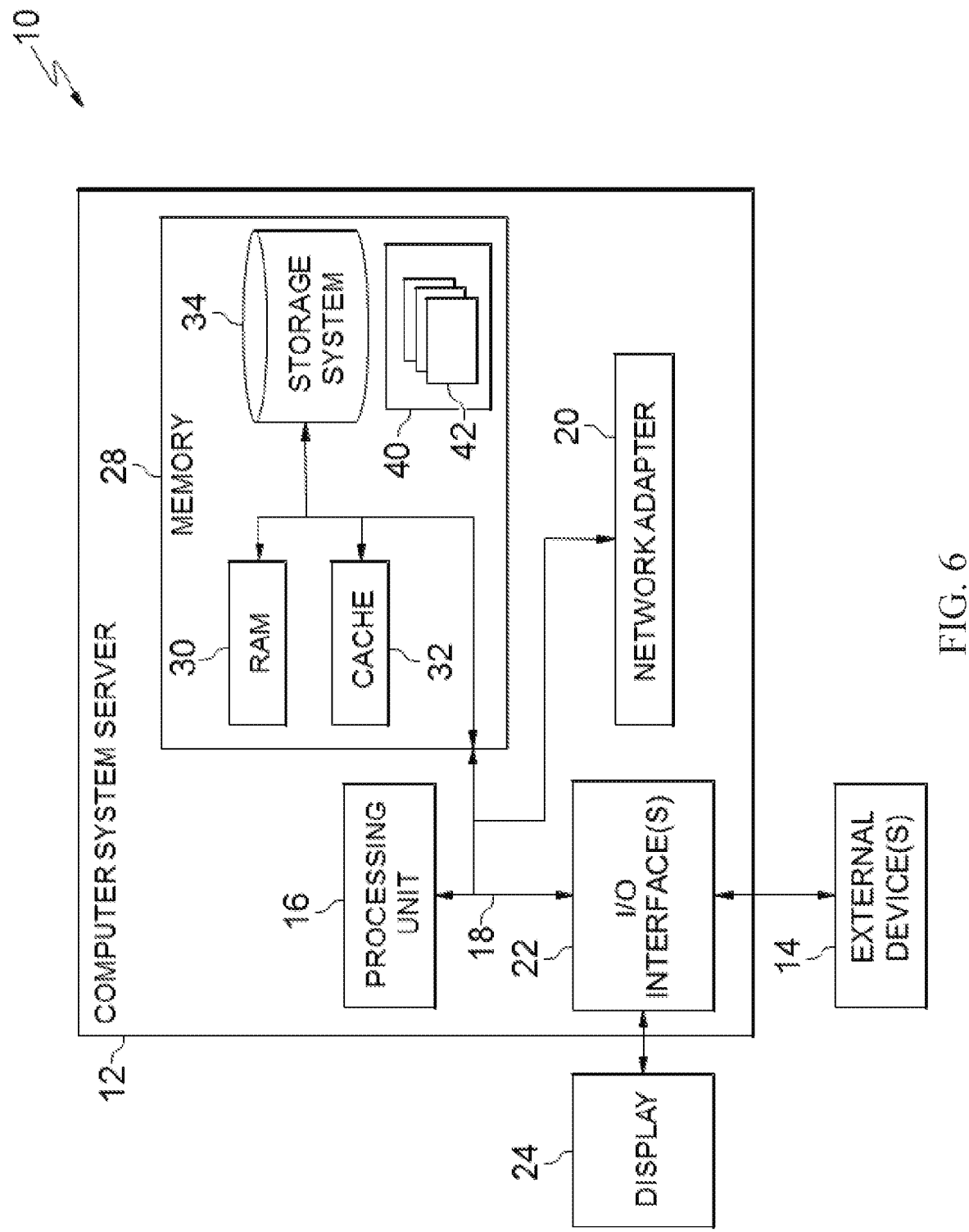
FIG. 6 is a block diagram depicting a cloud computing node, according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
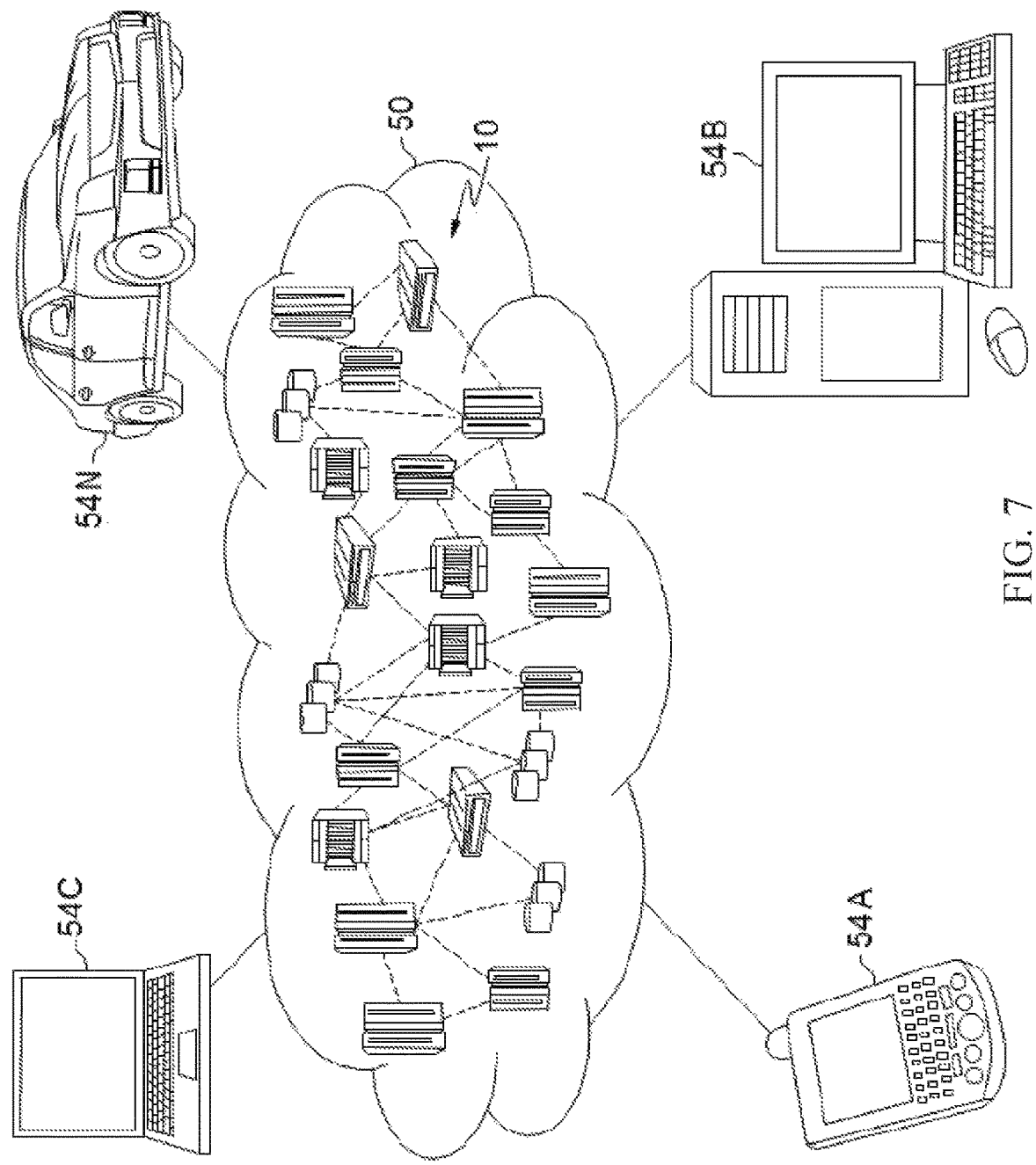
FIG. 7 is a schematic diagram depicting a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
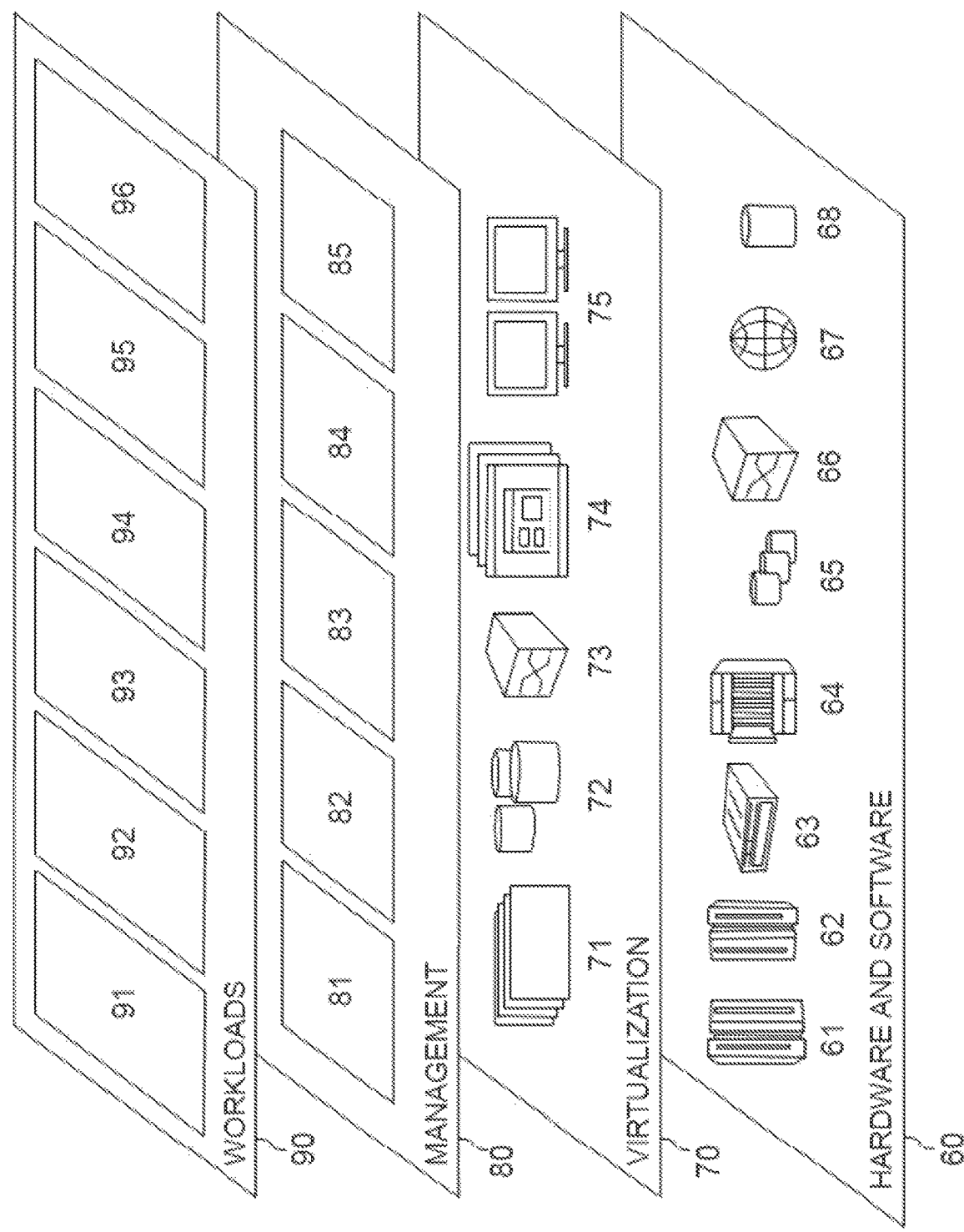
FIG. 8 is a schematic diagram depicting abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:
   receiving an available computing device data set including information indicative of: (i) an identity of a plurality of computer devices with each computer device including an amount of allocated computing resources, and (ii) for each given computer device of the plurality of computer devices, operational parameter values characterizing performance and capabilities of the given computer device;
   for each given computer device of the plurality of computer devices:
      defining an overcommit policy for the given computer device, with each overcommit policy including a set of machine logic based rules for determining a supplemental amount of allocated computing resources to allocate to a tenant workload being performed on the given computer device in circumstances where a tenant's workload temporarily requires more than a predetermined baseline amount of computing resources, and implementing, on the given computer device, the defined overcommit policy for the given computer device;
responsive to implementing the defined overcommit policy for each given computer device of the plurality of computer devices, grouping the plurality of computer devices into a plurality of overcommit zones, where all computer devices in a given zone of the plurality of zones have the same implemented overcommit policy;
receiving a cloud resource provisioning request including information indicative of : (i) identification of a prospective tenant workload, and (ii) information indicative of which computing resources are critical to workload performance;
selecting an overcommit zone based, at least in part, on the information indicative of which computing resources are critical to workload performance indicated by the cloud resource provisioning request and the overcommit policy of the plurality of computer devices grouped into the selected overcommit zone;
performing the prospective tenant workload on at least one computer device grouped into the selected overcommit zone, with the performance including at least one instance of performing some of the prospective tenant workload using some supplemental resources allocated to the at least one of the computer device grouped into the selected overcommit zone based on the implemented overcommit policy of the at least one computer device grouped into the selected overcommit zone; and
for the at least one computer device of the plurality of computer devices grouped into the selected overcommit zone, monitoring usage of the supplemental amount of allocated computing resources in performance of the prospective tenant workload.

2. The method of claim 1 further comprising:
determining that the supplemental amount of allocated resources yields sub-optimal performance of the prospective tenant workload based, at least in part, on the monitored usage;
determining an identity of a second computer device of the plurality of computer devices with an overcommit policy providing an improved supplemental amount of allocated resources for performing the prospective tenant workload; and
migrating the prospective tenant workload to the second computer device for performance of the prospective tenant workload.

3. The method of claim 1 wherein:
each overcommit zone includes two or more computer devices;
the plurality of overcommit zones include at least a first overcommit zone, a second overcommit zone, and a third overcommit zone;
the first overcommit zone has an overcommit policy with a set of machine logic based rules including a supplemental amount of allocated computing resources corresponding to computer processing throughput;
the second overcommit zone has an overcommit policy with a set of machine logic based rules including a supplemental amount of allocated computing resources corresponding to random access memory (RAM); and
the third overcommit zone has an overcommit policy with a set of machine logic based rules including a supplemental amount of allocated computing resources corresponding to computer data storage space.

4. The method of claim 3 wherein the first overcommit policy implemented on a first computer device of the plurality of computer device includes the following machine logic based rule: a maximum predetermined number of virtual central processing units (CPUs) provisioned by each processor core of the first computer device.

5. The method of claim 1 wherein the amount of computing resources includes an amount of memory.

6. The method of claim 1 wherein the information, included in the cloud resource provisioning request, indicative of information indicative of which computing resources are critical to workload performance includes at least one of the following types of information: (i) information indicative of how critical the prospective tenant workload is relative to a service level agreement, (ii) information indicative of how critical optimal memory use is for operation of the prospective tenant workload, and (iii) information indicative of how critical optimal provisioning of CPUs is to operation of the prospective tenant workload.

7. A computer program product (CPP) comprising:
a machine readable storage device; and
computer code stored on the machine readable storage device, with the computer code including instructions for causing a processor(s) set to perform operations including the following:
receiving an available computing device data set including information indicative of: (i) an identity of a plurality of computer devices with each computer device including an amount of allocated computing resources, and (ii) for each given computer device of the plurality of computer devices, operational parameter values characterizing performance and capabilities of the given computer device,
for each given computer device of the plurality of computer devices:
defining an overcommit policy for the given computer device, with each overcommit policy including a set of machine logic based rules for determining a supplemental amount of allocated computing resources to allocate to a tenant workload being performed on the given computer device in circumstances where a tenant's workload temporarily requires more than a predetermined baseline amount of computing resources, and
implementing, on the given computer device, the defined overcommit policy of determined for the given computer device,
responsive to implementing the defined overcommit policy for each given computer device of the plurality of computer devices, grouping the plurality of computer devices into a plurality of overcommit zones, where all computer devices in a given zone of the plurality of zones have the same implemented overcommit policy,
receiving a cloud resource provisioning request including information indicative of: (i) identification of a prospective tenant workload, and (ii) information indicative of which computing resources are critical to workload performance,
selecting an overcommit zone based, at least in part, on the information indicative of which computing resources are critical to workload performance indicated by the cloud resource provisioning request and the overcommit policy of the plurality of computer devices grouped into the selected overcommit zone, performing the prospective tenant workload on at least one computer device grouped into the selected overcommit zone, with the performance including at least one instance of performing some of the prospective tenant workload using some supplemental resources allocated to the at least one of the computer device grouped into the selected overcommit zone based on the implemented overcommit policy of the at least one computer device grouped into the selected overcommit zone, and for the at least one computer device of the selected plurality of computer devices grouped into the selected overcommit zone, monitoring usage of the supplemental amount of allocated computing resources in performance of the prospective tenant workload.

8. The CPP of claim 7 wherein the computer code further includes instructions for causing the processor(s) set to perform the following operations:

determining that the supplemental amount of allocated resources yields sub-optimal performance of the prospective tenant workload based, at least in part, on the monitored usage;

determining an identity of a second computer device of the plurality of computer devices with an overcommit policy providing an improved supplemental amount of allocated resources for performing the prospective tenant workload; and migrating the prospective tenant workload to the second computer device for performance of the prospective tenant workload.

9. The CPP of claim 7 wherein:

each overcommit zone includes two or more computer devices;

the plurality of overcommit zones include at least a first overcommit zone, a second overcommit zone, and a third overcommit zone;

the first overcommit zone has an overcommit policy with a set of machine logic based rules including a supplemental amount of allocated computing resources corresponding to computer processing throughput;

the second overcommit zone has an overcommit policy with a set of machine logic based rules including a supplemental amount of allocated computing resources corresponding to random access memory (RAM); and the third overcommit zone has an overcommit policy with a set of machine logic based rules including a supplemental amount of allocated computing resources corresponding to computer data storage space.

10. The CPP of claim 9 wherein the first overcommit policy implemented on a first computer device of the plurality of computer device includes the following machine logic based rule: a maximum predetermined number of virtual central processing units (CPUs) provisioned by each processor core of the first computer device.

11. The CPP of claim 7 wherein the amount of computing resources includes an amount of memory.

12. The CPP of claim 7 wherein the information, included in the cloud resource provisioning request, indicative of information indicative of which computing resources are critical to workload performance includes at least one of the following types of information: (i) information indicative of how critical the prospective tenant workload is relative to a service level agreement, (ii) information indicative of how critical optimal memory use is for operation of the prospective tenant workload, and (iii) information indicative of how critical optimal provisioning of CPUs is to operation of the prospective tenant workload.

13. A computer system (CS) comprising:

a processor(s) set;

a machine readable storage device; and computer code stored on the machine readable storage device, with the computer code including instructions for causing the processor(s) set to perform operations including the following:

receiving an available computing device data set including information indicative of: (i) an identity of a plurality of computer devices with each computer device including an amount of allocated computing resources, and (ii) for each given computer device of the plurality of computer devices, operational parameter values characterizing performance and capabilities of the given computer device, for each given computer device of the plurality of computer devices:

defining an overcommit policy for the given computer device, with each overcommit policy including a set of machine logic based rules for determining a supplemental amount of allocated computing resources to allocate to a tenant workload being performed on the given computer device in circumstances where a tenant's workload temporarily requires more than a predetermined baseline amount of computing resources, and implementing, on the given computer device, the defined overcommit policy of determined for the given computer device, responsive to implementing the defined overcommit policy for each given computer device of the plurality of computer devices, grouping the plurality of computer devices into a plurality of overcommit zones, where all computer devices in a given zone of the plurality of zones have the same implemented overcommit policy, receiving a cloud resource provisioning request including information indicative of: (i) identification of a prospective tenant workload, and (ii) information indicative of which computing resources are critical to workload performance, selecting an overcommit zone based, at least in part, on the information indicative of which computing resources are critical to workload performance indicated by the cloud resource provisioning request and the overcommit policy of the plurality of computer devices grouped into the selected overcommit zone, performing the prospective tenant workload on at least one computer device grouped into the selected overcommit zone, with the performance including at least one instance of performing some of the prospective tenant workload using some supplemental resources allocated to the at least one of the computer device grouped into the selected overcommit zone based on the implemented overcommit policy of the at least one computer device grouped into the selected overcommit zone, and for the at least one computer device of the plurality of computer devices grouped into the selected overcommit zone, monitoring usage of the supplemental amount of allocated computing resources in performance of the prospective tenant workload.

14. The CS of claim 13 wherein the computer code further includes instructions for causing the processor(s) set to perform the following operations:
- determining that the supplemental amount of allocated resources yields sub-optimal performance of the prospective tenant workload based, at least in part, on the monitored usage;
- determining an identity of a second computer device of the plurality of computer devices with an overcommit policy providing an improved supplemental amount of allocated resources for performing the prospective tenant workload; and
- migrating the prospective tenant workload to the second computer device for performance of the prospective tenant workload.

15. The CS of claim 13 wherein:
- each overcommit zone includes two or more computer devices;
- the plurality of overcommit zones include at least a first overcommit zone, a second overcommit zone, and a third overcommit zone;
- the first overcommit zone has an overcommit policy with a set of machine logic based rules including a supplemental amount of allocated computing resources corresponding to computer processing throughput;
- the second overcommit zone has an overcommit policy with a set of machine logic based rules including a supplemental amount of allocated computing resources corresponding to random access memory (RAM); and
- the third overcommit zone has an overcommit policy with a set of machine logic based rules including a supplemental amount of allocated computing resources corresponding to computer data storage space.

16. The CS of claim 15 wherein the first overcommit policy implemented on a first computer device of the plurality of computer device includes the following machine logic based rule: a maximum predetermined number of virtual central processing units (CPUs) provisioned by each processor core of the first computer device.

17. The CS of claim 13 wherein the information, included in the cloud resource provisioning request, indicative of information indicative of which computing resources are critical to workload performance includes at least one of the following types of information: (i) information indicative of how critical the prospective tenant workload is relative to a service level agreement, (ii) information indicative of how critical optimal memory use is for operation of the prospective tenant workload, and (iii) information indicative of how critical optimal provisioning of CPUs is to operation of the prospective tenant workload.

* * * * *